United States Patent [19]

Ryu

[11] Patent Number: 5,671,025
[45] Date of Patent: Sep. 23, 1997

[54] DIGITAL CONVERGENCE CORRECTING METHOD AND APPARATUS ADOPTING THE SAME

[75] Inventor: Kyeong-keol Ryu, Seoul, Rep. of Korea

[73] Assignee: Samsung Electronics Co., Ltd., Kyungki-do, Rep. of Korea

[21] Appl. No.: 408,037

[22] Filed: Mar. 21, 1995

[30] Foreign Application Priority Data

Mar. 21, 1994 [KR] Rep. of Korea ............ 94-5642

[51] Int. Cl.⁶ ............................................. H04N 9/28
[52] U.S. Cl. ................... 348/745; 348/746; 315/368.15
[58] Field of Search ............................ 348/745, 746, 348/747, 806, 807, 189, 190, 191, 181–183; 315/368.12, 368.13, 365, 368.18; H04N 9/28

[56] References Cited

U.S. PATENT DOCUMENTS

| 4,672,275 | 6/1987 | Ando | 348/745 |
| 5,016,095 | 5/1991 | Kii | 348/806 |
| 5,216,497 | 6/1993 | Tsujihara et al. | 348/745 |
| 5,345,280 | 9/1994 | Kimura et al. | 348/746 |
| 5,463,427 | 10/1995 | Kawashima | 348/745 |

Primary Examiner—Michael H. Lee
Attorney, Agent, or Firm—Sughrue, Mion, Zinn, Macpeak and Seas

[57] ABSTRACT

A digital convergence correcting apparatus for a projection-type television set performs an interpolation calculation by employing an auxiliary calculating processor, to thereby perform faster convergence correction. In addition, an OSD block permitting user interface is unified with a test pattern generating block, thereby simplifying the overall hardware structure. A method for operating the digital convergence correcting apparatus is also described.

11 Claims, 4 Drawing Sheets

DIGITAL CONVERGENCE CORRECTING METHOD AND APPARATUS ADOPTING THE SAME

BACKGROUND OF THE INVENTION

The present invention relates to a digital convergence correcting method and an apparatus adopting the same, and more particularly, to a method for correcting convergence at high speed and an apparatus adopting the same.

In a display device having three electron guns for red (R), green (G) and blue (B), convergence is the condition where the three electron beams thereof are concentrated at one point on the surface of a shadow mask. This condition does not occur automatically and needs to be "corrected" so that proper convergence is achieved. Here, the convergence correction is necessary since the positions of the R, G and B electron guns are slightly different from each other and since the distance from the deflection center point to the fluorescence surface or shadow mask surface varies across a screen. If the proper convergence is not attained, the adjacent phosphors of the fluorescent material do not emit their predetermined amounts of light, which causes poor color purity.

In a color television set, three pairs of horizontal and vertical convergence coils, respectively wound onto a U-shaped ferrite core, are disposed at 120° around the neck of a CRT so as to concentrate the three electron beams onto a shadow mask surface of a fluorescence surface. In addition, a convergence yoke wherein a controllable permanent magnet is inserted is provided. A static convergence for beam concentration at the center of a screen mainly employs the permanent magnet inserted into the convergence yoke, while a dynamic convergence for beam concentration at the peripheral portion of a screen is realized by periodically inducing the proper level of parabolic current in the horizontal and vertical convergence coils. However, when precision correction is required in such a conventional analog convergence correcting system, the correction time is short, while the circuitry is complicated when fine convergence correction is required.

Meanwhile, a digital convergence correcting system has been introduced as an improvement to the above-described analog convergence correcting system. Here, a screen image which is distorted by the differing beam positions of each electron gun (R, G and B) in a CRT projector and a projection television employing a three-tube CRT can be corrected.

FIG. 1 is a block diagram showing an example of a conventional digital convergence correcting apparatus which comprises a central processing unit (CPU) 1, controller 2, shift registers 8 and 9, a digital-to-analog converter (DAC) 7, and various memories. Here, the memories include an EEPROM 3, EPROM 4, SRAM 5, and a VRAM constituted by a convergence buffer 6-1, a test pattern buffer 6-2 and an on-screen-display (OSD) buffer 6-3.

Referring to FIG. 1, a conventional digital convergence correcting apparatus has a typical computer structure where an operation for converting seed data into convergence data at a predetermined position on a screen depends solely on CPU 1.

When power is turned on, CPU 1 is initialized and booting starts by reading a program stored in EPROM 4. When the booting is completed, CPU 1 reads seed data stored in EEPROM 3 so as to perform an interpolation for converting the seed data into convergence data. Then, the interpolated data is transmitted to convergence buffer 6-1 and output to digital-to-analog converter 7. Here, SRAM 5 is used as a system area of CPU 1.

In the meantime, a convergence test pattern, i.e., a reference pattern for testing screen convergence, and OSD data have to be generated in order to correct convergence on the screen, which requires CPU 1 to write test pattern data into VRAM. Then, parallel data output from VRAM is changed into serial data by employing shift register 8 and output to a video board (not shown). The OSD data is output by the same operation as that for outputting the test pattern data.

However, in the above-described digital convergence correcting apparatus, convergence data with respect to six modes divided by R, G and B CRTs and horizontal and vertical control modes are stored independently in order to correct a convergence. Therefore, a large capacity memory is required and six digital-to-analog converters are required for each memory bank.

In addition, when an applied set employs a non-spherical CRT and lens and performs a double scan instead of an existing normal scan, a multi dimension interpolation calculation suitable for the non-spherical surface is required in order to produce convergence data with respect to each seed data. The double scan calculates twice the data as the normal scan and the amount of calculation increases accordingly, so that the time required for initializing and controlling convergence increases.

Further, an additional microcomputer or an independent OSD block is required in using an on-screen display for user interface, to thereby increase the overall volume of the hardware.

SUMMARY OF THE INVENTION

Accordingly, it is an object of the present invention to provide a digital convergence correcting method for reducing a convergence correcting time period and simplifying an OSD block employed for user interface in a projection-type television set.

It is another object of the present invention to provide the most suitable apparatus for realizing the above digital convergence correcting method.

To accomplish the above object, there is provided a digital convergence correcting method for use in a projection-type television set, comprising the steps of: (a) interpolating ideal seed data to produce convergence correcting data with respect to said seed data at a predetermined screen position stored in a memory; (b) displaying test pattern data and OSD data on the screen; and (c) correcting and updating the convergence correcting data produced by the step (a) with respect to seed data at a different screen position according to an externally applied instruction.

To accomplish another object of the present invention, there is provided a digital convergence correcting apparatus for use in a projection-type television set, comprising: a CPU for controlling overall convergence correcting; an auxiliary calculating processor controlled by the CPU and which performs an interpolation calculation for seed data at a predetermined screen position so as to output convergence correcting data to the CPU; a plurality of memories for storing an operation program for booting the CPU and auxiliary calculating processor and the seed data, and which is employed as a system area of the CPU and the auxiliary calculating processor; a convergence buffer for storing convergence correcting data output from the CPU; a test pattern and OSD buffer for storing test pattern data and OSD data output from the CPU; a convergence output module for latching vertical and horizontal convergence correction data output from said convergence buffer, converting the correction data into an analog signal and outputting the converted result; and a controller for controlling operation of the CPU, the auxiliary calculating processor and the memories.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENTS

Figure 1:
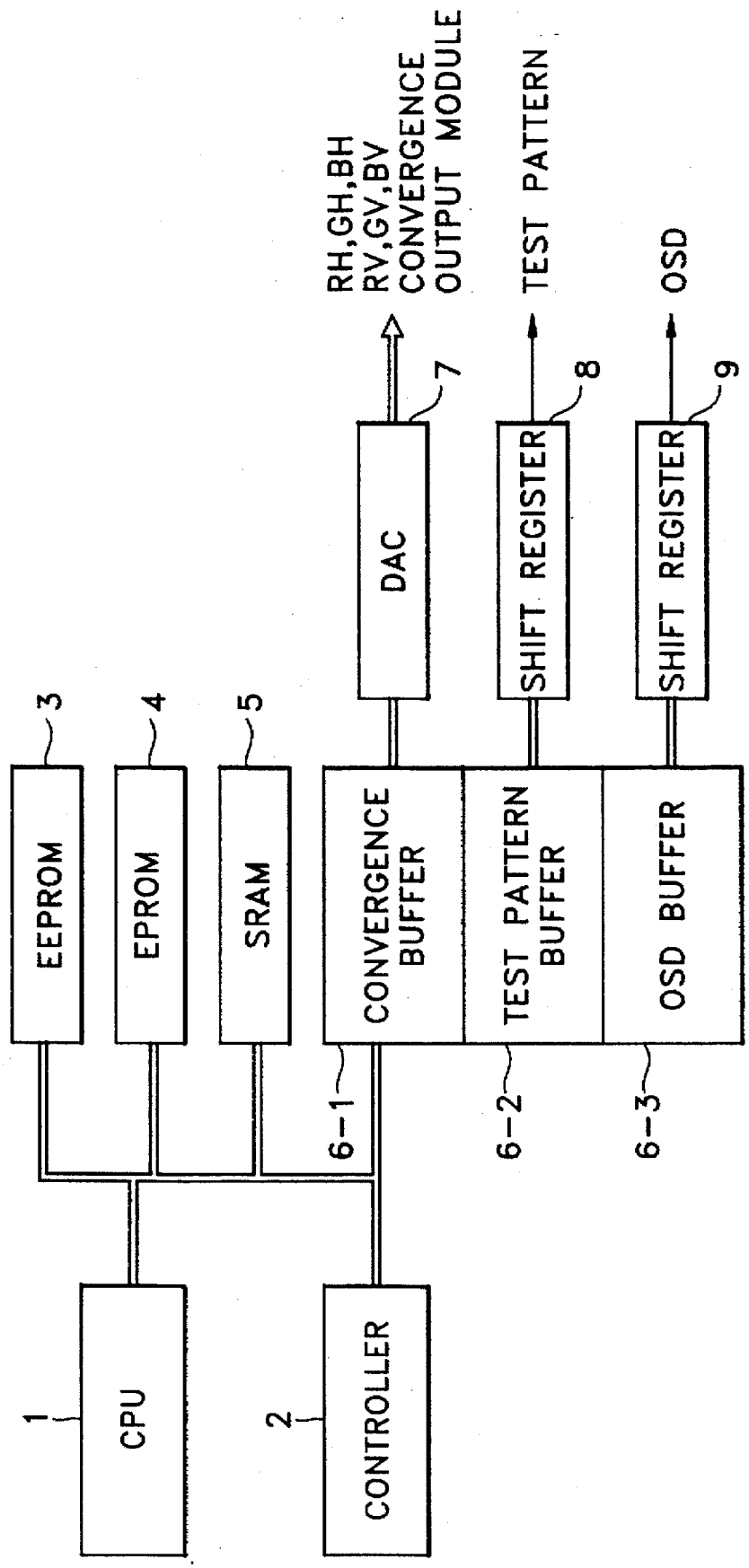
FIG. 1 is a block diagram showing a conventional digital convergence correcting apparatus.
Figure 2:
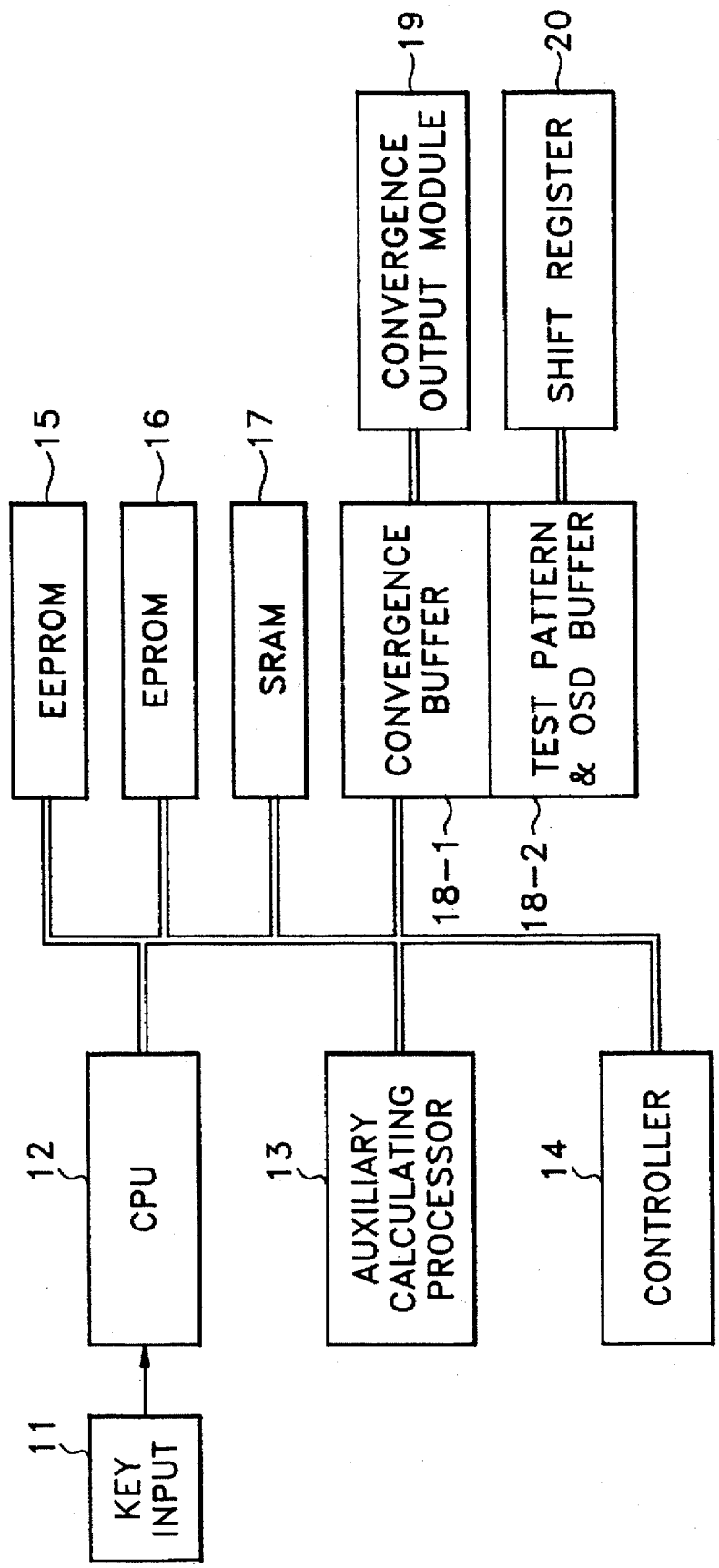
FIG. 2 is a block diagram showing an embodiment of a digital convergence correcting apparatus of the present invention.

FIG. 2 is a block diagram showing an embodiment of a digital convergence correcting apparatus of the present invention.

The digital convergence correcting apparatus shown in FIG. 2 comprises a CPU 12 for controlling convergence correction on the whole, key input means 11 for applying a function-performing instruction to CPU 12, an auxiliary calculating processor 13 which is controlled by CPU 12 to perform an interpolation calculation among seed data at predetermined screen positions and output the convergence correction data to CPU 12, a controller 14 for controlling operations of the CPU 12, auxiliary calculating processor 13 and plural memories 15, 16 and 17, a plurality of memories 15, 16 and 17 for storing an operation program and seed data for booting CPU 12 and auxiliary calculating processor 13 and which are employed as system areas of CPU 12 and auxiliary calculating processor 13, a convergence buffer 18-1 for storing convergence correction data output from CPU 12, a test pattern and OSD buffer 18-2 for storing test pattern data and OSD data output from CPU 12, a convergence output module 19 for latching the vertical and horizontal convergence correction data output from convergence buffer 18-1, converting the correction data into an analog signal and outputting the result, and a shift register 20 for converting parallel data output from test pattern and OSD buffer 18-2 into serial data.

Figure 3:
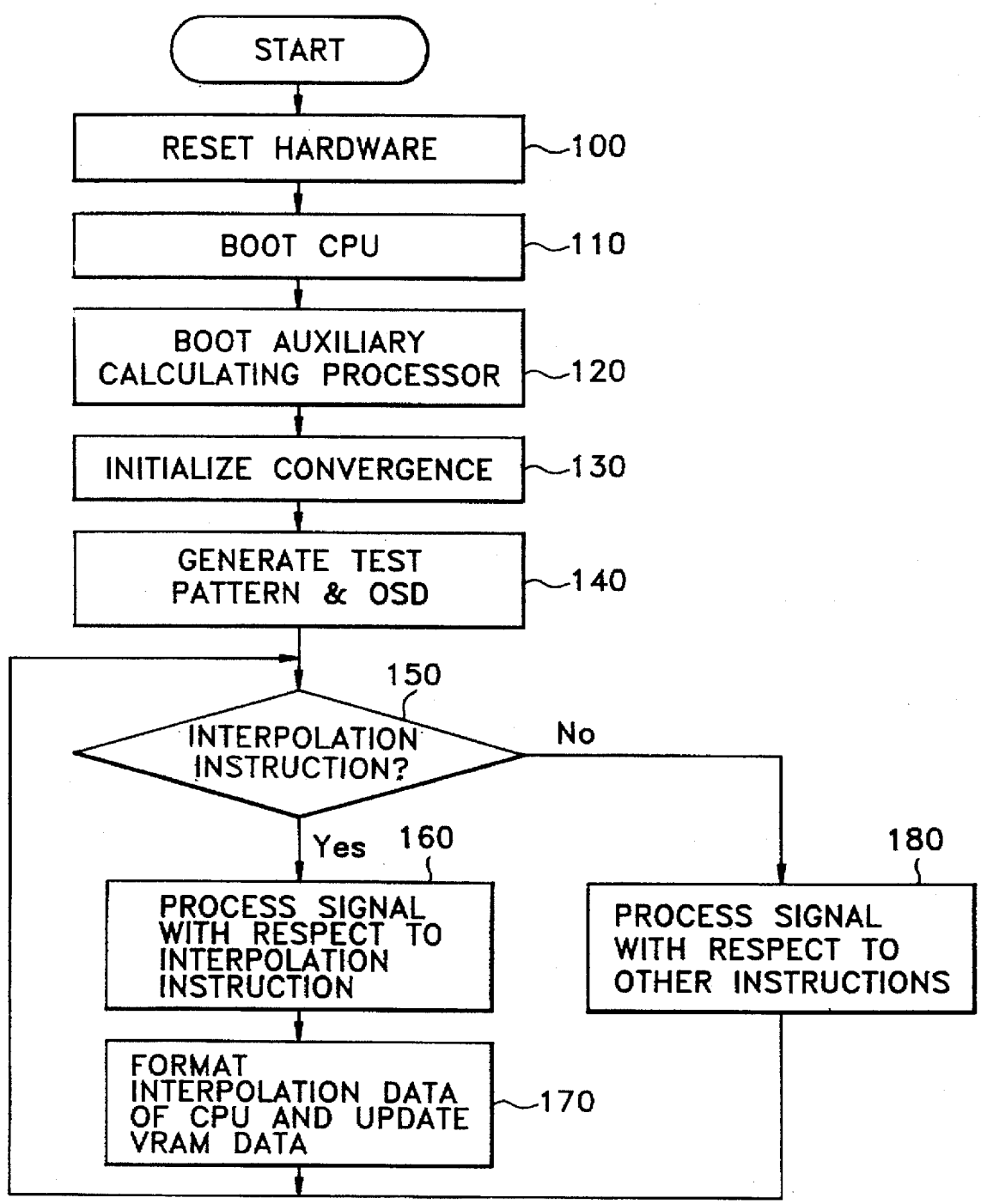
FIG. 3 is a flowchart illustrating a digital convergence correcting method of the present invention.

FIG. 3 is a flowchart illustrating a digital convergence correcting method of the present invention. In the method, steps 110 to 130 are for performing an interpolation in an auxiliary calculating processor 13 in order to produce convergence correction data for ideal seed data with respect to a predetermined screen position stored in a memory, step 140 is for displaying test pattern and OSD data on a screen, and steps 150 to 180 are for correcting and updating the convergence correction data produced by steps 110 to 130 with respect to seed data at a different screen position.

Figure 4:
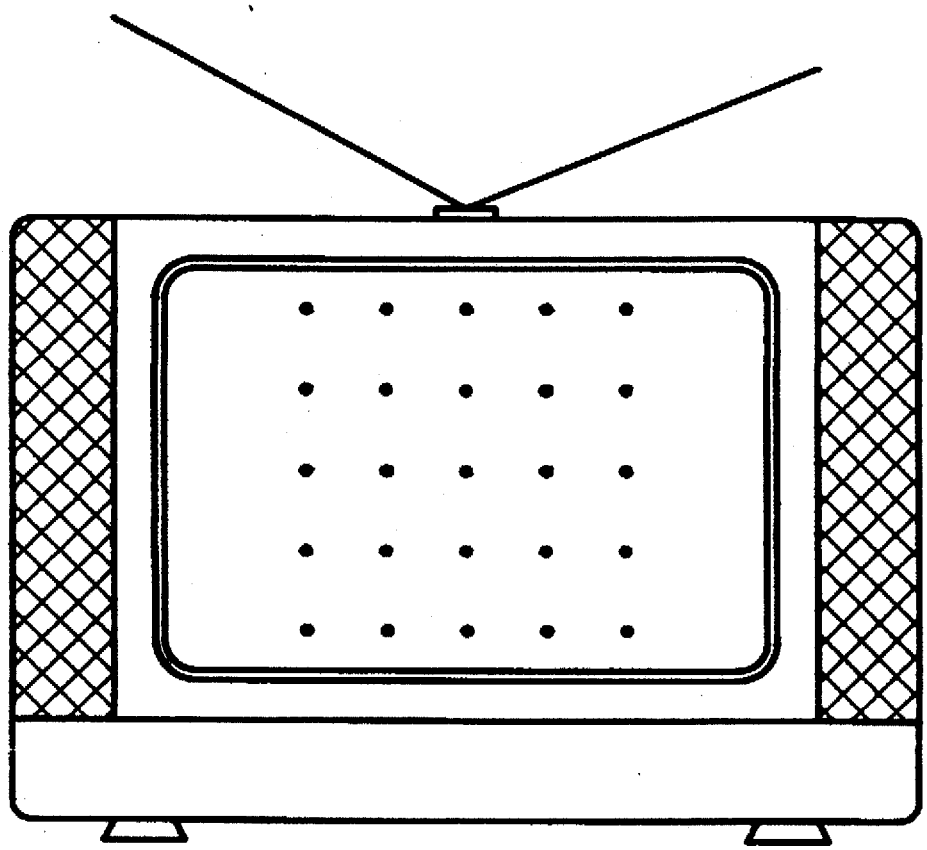
FIG. 4 illustrates ideal seed points.

FIG. 4 illustrates an ideal seed point, wherein a 5×5 pixel pattern is exemplified.

Now, the operation of the present invention will be explained with reference to FIGS. 2, 3 and 4.

First, when a system is turned on, CPU 12 is reset (step 100) and CPU 12 reads an operation program from EPROM 16 in order to start booting (step 110). When CPU booting is completed by step 110, CPU 12 boots auxiliary calculating processor 13 which in turn reads an operation program from EPROM 16 in order to start its own booting operation (step 120).

When the booting of CPU 12 and auxiliary calculating processor 13 is completed by the above steps, seed data at a predetermined position constituted by the 5-point-by-5-point pixel pattern shown in FIG. 4 is read from EEPROM 15 that stores seed data with respect to each seed point according to a convergence and stored into a specific area of SRAM 17 which is a common memory of CPU 12 and auxiliary calculating processor 13. Then, CPU 12 applies an instruction of performing an interpolation to auxiliary processor 13, and auxiliary calculating processor 13 produces interpolation data, for example, data of 16 points in width and 512 points in length and re-stores the result in SRAM 17. Then, CPU 12 converts data stored in SRAM 17 into a predetermined form and re-stores the result into convergence buffer 18-1 that consists of VRAM memory, to thereby complete a convergence initialization (step 130).

After step 130, CPU 12 stores test pattern data and OSD data into test pattern and OSD buffer 18-2 that consists of VRAM memory, thereby generating test pattern and OSD data onto a screen (step 140).

Steps 110 to 140 are initialization for an overall step, and hereinafter CPU 12 prepares convergence data correction and updating.

That is, it is determined whether an instruction for retrieving seed data and controlling a convergence is applied to CPU 12 by key input means 11 (step 150), and if so, CPU 12 confirms the seed data in SRAM 17 and auxiliary calculating processor 13 controls to start an interpolation calculation (step 160). Otherwise, a control for signal processing for other instructions is performed (step 180). In other words, auxiliary calculating processor 13 produces interpolation data of 16 points in width and 512 points in length and re-stores the result into SRAM 17, to thereby perform a signal processing for an interpolation instruction.

After step 160, CPU 12 converts interpolation data stored in SRAM 17 into a predetermined form and stores the result into convergence buffer 18-1, thereby completing a convergence updating (step 170).

In the meantime, CPU 12 issues other instructions for controlling a system and an interpolation instruction as well. That is, CPU 12 controls (video) muting operations of the R, G and B CRTs and determines which pattern of either a test pattern or source pattern is to be displayed onto the screen.

Controller 14 has a logic necessary for allowing CPU 12 to control memories 15, 16, 17, 18-1 and 18-2, decodes addresses of memories 15, 16, 17, 18-1 and 18-2, and generates controls signals for the VRAM and test pattern and OSD data.

Convergence buffer 18-1 and test pattern and OSD buffer 18-2 are realized by VRAM memories. In addition, an OSD memory area and a test pattern memory area are commonly used in test pattern and OSD buffer 18-2. Thus, convergence buffer 18-1 and test pattern and OSD buffer 18-2 logically sum the test pattern data and OSD data and output the result to shift register 20.

As described above, a digital convergence correcting method and apparatus of the present invention perform an interpolation calculation by employing an auxiliary calculating processor so as to promptly perform convergence correction. Further, an OSD block for user interface is unified with a test pattern generating block, thereby simplifying the overall hardware structure.

What is claimed is:

1. A digital convergence correcting method for use in a projection-type television set, said method comprising the steps of:

(a) interpolating an ideal seed data to produce convergence correcting data with respect to said seed data at a predetermined screen position stored in a memory;

(b) displaying test pattern data and on screen display (OSD) data on the screen; and (c) correcting and updating the convergence correcting data produced by said step (a) with respect to said seed data at a different screen position according to an externally applied instruction.

2. A digital convergence correcting apparatus for use in a projection-type television set, comprising:

a central processing unit (CPU) for controlling overall convergence correcting;

an auxiliary calculating processor, controlled by said CPU, performing an interpolation calculation for seed data at a predetermined screen position so as to output convergence correcting data to said CPU;

a plurality of memories for storing an operation program for booting said CPU and said auxiliary calculating processor and the seed data, at least one of said memories being employable as a system area of said CPU and said auxiliary calculating processor;

a convergence buffer for storing convergence correcting data output from said CPU and providing vertical and horizontal convergence correction data;

a test pattern and on screen display (OSD) buffer for storing test pattern data and OSD data output from said CPU;

a convergence output module latching said vertical and horizontal convergence correction data output from said convergence buffer, converting the correction data into an analog signal and outputting the converted result; and a controller for controlling operation of said CPU, said auxiliary calculating processor and said memories.

3. The digital convergence correcting apparatus according to claim 2, further comprising a shift register for converting parallel data output from said test pattern and OSD buffer into serial data.

4. The digital convergence correcting apparatus according to claim 2, wherein said CPU and said auxiliary calculating processor are commonly connected to a selected memory of said memories so as to permit said selected memory to be used as said system area, wherein said CPU reads seed data stored in said memory for the purpose of initializing a convergence and applies said read seed data to said auxiliary calculating processor, and wherein the convergence correction data produced by said auxiliary calculating processor via interpolation calculation is re-applied to said CPU.

5. The digital convergence correcting apparatus according to claim 2, wherein said convergence buffer and said test pattern and OSD buffer are realized by a video random access memory (VRAM).

6. The digital convergence correcting apparatus according to claim 5, wherein an OSD memory area and a test pattern memory area are commonly used in said test pattern and OSD buffer.

7. A digital convergence correcting apparatus for use in a projection-type television set, comprising:

first means for controlling overall convergence correcting;

second means controlled by said first means for performing an interpolation calculation for seed data at a predetermined screen position so as to output convergence correcting data to said first means;

first memory means for storing an operation program for booting said first and said second means;

second memory means for storing said seed data;

third memory means for providing a storage area accessed by said first and said second means;

first buffer means for storing convergence correcting data output from said first means and for providing vertical and horizontal convergence correcting data;

second buffer means for storing test pattern data and OSD data output from said first means;

latch means for latching said vertical and horizontal convergence correction data output from said first buffer means, for converting respective correction data into an analog signal and for outputting the converted result; and control means for controlling operation of said first and said second means and said first through said third memory means.

8. The digital convergence correcting apparatus according to claim 7, further comprising register means for converting parallel data output from said second buffer means into serial data.

9. The digital convergence correcting apparatus according to claim 7, wherein said first and said second means share said third memory means, wherein said first means reads seed data stored in said second memory means for the purpose of initializing convergence processing and applies said read seed data to said second means, and wherein respective convergence correction data produced by said second means via interpolation calculation is re-applied to said first means.

10. The digital convergence correcting apparatus according to claim 7, wherein said first and said second buffer means collectively form a video random access memory (VRAM).

11. The digital convergence correcting apparatus according to claim 7, wherein said first means is a central processing unit (CPU) and wherein said second means is an auxiliary calculating processor.

* * * * *